T. H. SCHOEPF.
CONTROL SYSTEM.
APPLICATION FILED MAY 8, 1916.
1,352,480. Patented Sept. 14, 1920.
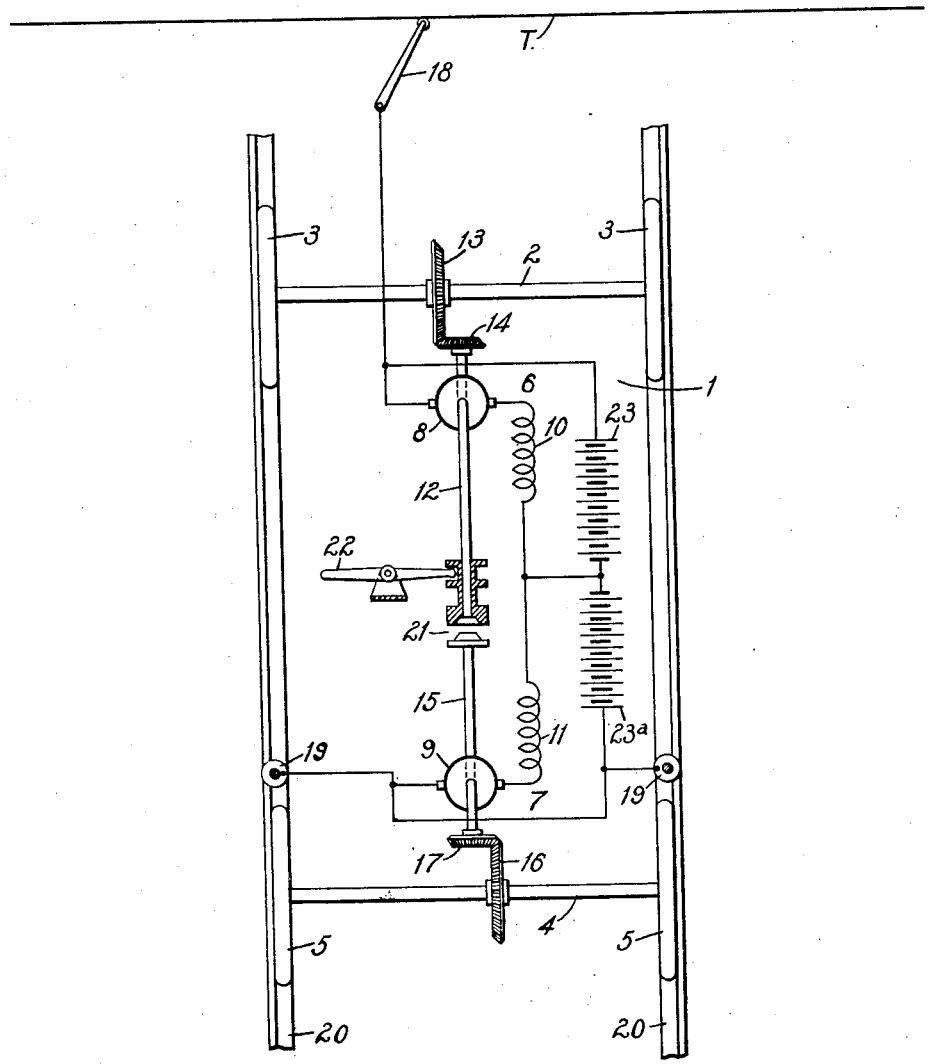
WITNESSES:
R. J. Fitzgerald
W. B. Wells
INVENTOR
Theodore H. Schoepf.
BY
Wesley G. Carr
ATTORNEY

UNITED STATES PATENT OFFICE.

THEODORE H. SCHOEPF, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,352,480.

Specification of Letters Patent. Patented Sept. 14, 1920.

Application filed May 8, 1916. Serial No. 96,139.

*To all whom it may concern:*

Be it known that I, THEODORE H. SCHOEPF, a citizen of the United States, and a resident of Pittsburgh, in the county of Allegheny and State of Pennsylvania, have invented a new and useful Improvement in Control Systems, of which the following is a specification.

My invention relates to electrically propelled vehicles and particularly to vehicles that are adapted for operation from either a storage battery carried thereon or from an external source of energy, such as a trolley conductor.

One object of my invention is to provide a system of control for an electrically propelled vehicle adapted to be supplied with energy from either a trolley or a storage battery which shall include means for charging the battery when the vehicle is being operated by energy supplied from the trolley.

Another object of my invention is to provide an electrically propelled vehicle of the so-called "trackless trolley" type which is usually provided with rubber tired wheels and is adapted to be independent of tracks, and to provide means whereby the usual grounded trolley system of an ordinary electric railway system may be employed for supplying energy thereto, suitable traveling electrical contacts being made with the trolley conductor and the track for the purpose of collecting energy from, and returning it to, the source of supply.

A further object of my invention is to provide an electrically propelled vehicle having a front and a rear driving axle with means whereby the driving axles may be jointly or severally operated by an external source of power.

More specifically, my invention consists of an electric vehicle adapted to be propelled by energy supplied by a storage battery carried thereon, or from a trolley conductor having a ground return. The vehicle is provided with two driving axles and two motors having the armature shafts thereof respectively joined to the driving axles. A clutch is disposed between the two motors for joining the armature shafts, whereby the driving axles may be jointly or severally operated by the motors.

For illustrative purposes, I shall set forth my invention in connection with a vehicle of the trackless-trolley type, but it should be understood that my invention is not, in any sense, so restricted but is equally applicable to various other classes of electrically propelled vehicles and conditions of service, such, for example, as mining locomotives.

The single figure of the accompanying drawing is a diagrammatic view of an electrically propelled vehicle and a system of control therefor, embodying my invention.

Referring to the drawing, an electrically propelled vehicle 1 is provided with a front driving axle 2 having driving wheels 3 mounted thereon, and a rear driving axle 4 having driving wheels 5 mounted thereon. The electric vehicle 1 is adapted to be propelled by electric motors 6 and 7 having, respectively, armatures 8 and 9 and field windings 10 and 11. The armature 8 of the motor 6 is mounted upon a shaft 12 which is connected to the driving axle 2 by means of beveled gear wheels 13 and 14. The armature 9 of the driving motor 7 is mounted upon a shaft 15 which is connected to the driving axle 4 by means of beveled gear wheels 16 and 17. The motors may be connected to an external source of energy comprising a trolley T and ground-return rails 20 by means of a trolley pole 18 and brushes 19. A friction clutch 21, which is disposed between the motors 6 and 7 for joining the shafts 12 and 15, may be operated by a lever 22.

If the vehicle takes the form of the usual trackless trolley, the driving wheels 3 and 5 are provided with suitable tires of rubber or other resilient and incidentally, insulating material, although, in the case of mining locomotives or certain other classes of vehicles, the wheels 3 and 5 need not necessarily be so tired but may be of the usual steel construction such as are commonly employed on electric railway cars and locomotives that are adapted for operation upon tracks.

In case a source of energy be connected to the trolley T and the rails 20 and the electric vehicle 1 be in its indicated position, a circuit will be completed from the trolley T to the rails 20 which may be traced through the trolley pole 18, where the circuit divides one branch extending through the armature 8, field windings 10 and 11, armature 9 and the brush 19 to the rail 20, and the second branch extending through storage batteries 23 and 23ᵃ and the brush 19 to the rail 20. The two motors 6 and 7 are energized, and, with the friction clutch in its indicated position, the driving axles 2 and 4 will be severally operated by the motors. In case it is desired to jointly operate the axles 2 and 4 by the two motors 6 and 7, the lever 22 will be operated to throw the friction clutch 21 into an operating position. When operating the motors from the trolley T, it may be noted that the storage batteries 23 and 23ᵃ are charged by the branch circuit which extends around the motors 6 and 7.

In case it is desired to operate the electric vehicle beyond the range of the trolley T and the rails 20, the storage batteries 23 and 23ᵃ serve as sources of energy for operating the driving motors 6 and 7. The driving motor 7 is directly connected to the axle 4, but, if so desired, the two shafts 15 and 12 may be connected by the clutch 21 so that the motor 7, when energized by the battery 23ᵃ, may jointly operate the driving shafts 2 and 4. Similarly, the motor 6, when energized by the battery 23, may operate the axle 2 or jointly operate the axles 2 and 4.

Obviously, variations in the circuit connections and arrangement and location of parts may be effected without departing from the spirit and scope of my invention, and the advantages and benefits thereof may be secured by vehicles of a control system and apparatus differing widely from that shown and described but which cover the same general principles. I desire, therefore, that only such limitations shall be imposed as are indicated in the appended claims.

I claim as my invention:

1. In a vehicle having a front and a rear driving axle and a pair of wheels on each axle, the combination with an external source of energy and an auxiliary source of energy disposed on said vehicle, of means for severally and jointly operating said driving axles by said external source of energy and for jointly operating said driving axles by said auxiliary source of energy.

2. In an electrically propelled vehicle, the combination with two driving axles, pairs of driving wheels thereon, two propelling motors having armature shafts geared to the respective driving axles, an external source of energy, and an auxiliary source of energy disposed on the vehicle, of means for severally operating said axles when the motors are connected in series to said external source of energy and means for joining said armature shafts, whereby the driving axles may be jointly operated in case one motor is operated by the auxiliary source of energy.

3. In an electrically propelled vehicle having two driving axles, the combination with two motors respectively joined to said axles, an external source of energy and an auxiliary source of energy, of means for energizing said motors in series by the external source of energy to severally operate said driving axles and to energize said motors from the auxiliary source of energy to jointly operate said driving axles.

4. In an electrically propelled vehicle having two parallel driving axles, the combination with two motors, means for mechanically joining a motor to each of said driving axles, an external source of energy and a storage battery, of means for joining said motors to the external source of energy to severally operate said driving axles and to charge said storage battery and for energizing one of said motors by the storage battery to jointly operate said driving axles.

5. In an electrically propelled vehicle having two driving axles and a pair of wheels on each axle, the combination with an external source of energy, an auxiliary source of energy and two propelling motors, of means for severally operating said driving axles in case said motors are energized by the external source of energy and for jointly operating said driving axles in case one of said motors is energized by said auxiliary source of energy.

6. The combination with a supply circuit comprising a trolley conductor and a rail return, of an electrically propelled vehicle having a front and a rear driving axle, two motors joined to said axles, means for severally or jointly operating said driving axles in case said motors are connected across said supply circuit, an auxiliary source of energy disposed on said vehicle, and means for severally and jointly operating said driving axles in case said motors are energized by said auxiliary source of energy.

In testimony whereof, I have hereunto subscribed my name this 24th day of April, 1916.

THEODORE H. SCHOEPF.